United States Patent [19]

Schwartz et al.

[11] Patent Number: 4,537,216
[45] Date of Patent: Aug. 27, 1985

[54] ANTI-KNOCK LIQUID FLOW CONTROL VALVE

[76] Inventors: Edwin Schwartz, 16604 Park Lane Pl., Los Angeles, Calif. 90049; David Frees, 5407 Amestoy, Encino, Calif. 91316

[21] Appl. No.: 630,536

[22] Filed: Jul. 13, 1984

[51] Int. Cl.³ .................... F16K 15/00; F16K 47/02
[52] U.S. Cl. .................................... 137/514; 137/540; 137/843; 417/540
[58] Field of Search ............... 137/514, 540, 843, 528; 138/30; 417/540, 566

[56] References Cited

U.S. PATENT DOCUMENTS

| | | | |
|---|---|---|---|
| 1,950,107 | 3/1934 | Guinn | 138/30 |
| 2,809,665 | 10/1957 | Crowe | 138/30 |
| 2,829,669 | 4/1958 | Luzynski | 138/30 X |
| 3,019,818 | 2/1962 | Everett | 138/30 |
| 3,797,522 | 3/1974 | Carleton | 137/528 |
| 4,161,223 | 7/1979 | Oelke | 137/540 X |

*Primary Examiner*—Robert G. Nilson

[57] ABSTRACT

The liquid flow valve of the present invention is a one-way shock-absorbing valve specifically designed to dampen noise and vibrations, and exhibiting improved durability and utility. The valve comprises a housing defining a passageway extending longitudinally therethrough and a shoulder extending into the passageway. It also includes a valve element housing a main body defining a central longitudinal conduit and also having an expanded seat. The element is slideably disposed in the passageway for movement between a valve-closed seated position on the shoulder and a valve-open unseated position. The valve element features a bellows connected to the main body to seal the conduit. The bellows elongated, that is, unfolds in response to liquid back pressure directed upstream and thus dampens shocks and knocking which otherwise would occur. The bellows comprises readily moveable durable components and may be disposed in the conduit and/or extend from an end of the valve element main body. The valve is inexpensive, efficient and durable.

1 Claim, 5 Drawing Figures

ANTI-KNOCK LIQUID FLOW CONTROL VALVE

BACKGROUND OF THE INVENTION

1. Field of the Invention

The present invention generally relates to valve and, more particularly, to shock-absorbing one-way liquid flow control valves of an improved type.

2. Prior Art

One way liquid flow control valves of various types have been designed and utilized. Certain of such valves include flexible valve members. Those flexible valve members which are of relatively hard material, generally are not easy to open and are unsuitable for applications in which large pressure drops across the valve cannot be tolerated. Such hard valves also are usually very noisy to operate. However, when the flexible valve member is fabricated of a relatively soft material, it will usually readily deform so that only a very small pressure drop is necessary to open the valve. Unfortunately, very low temporary back pressure surges or increases also tend to close the valve, so that it is in many instances unsuitable for various applications.

Spring loaded check valves which rapidly close are commonly used in the plungers of electromagnetic fuel pumps employed in land vehicles and the like. Recently, electromagnetic pump plungers have been operated at relatively higher speeds than formerly. However, as pump plunger speeds increased and valve closing times correspondingly decrease, the pumps generate excessive noise. This noise is caused by shock waves generated by the valve in the plunger.

U.S. Pat. No. 3,797,522 seeks to address this problem. The patent describes a one-way valve which features knock dampening properties. However, the valve employs a valve element which utilizes a thin expandable elastic balloon or bulb, the expansion thereof having the effect of absorbing shock waves normally generated in the presence of back pressure in the valve. The balloon is necessarily fragile and subject to rapid wear in use due to the continuous overall expansion and contraction it undergoes and the fact it is made of organic easily damageable material. The valve itself is fabricated of rubber or the like, the expandable balloon also being of thin rubber or the like elastomer.

Accordingly, there remains a need for an efficient one-way liquid flow control valve for electromagnetic fuel pumps and the like, which valve is of durable construction and which effectively dampens or eliminates shock waves normally generated in the valve during periods of back pressure.

SUMMARY OF THE INVENTION

The improved shock-absorbing one-way flow control value of the present invention satisfies all the foregoing needs. The valve is substantially as set forth in the Abstract above. Thus, the valve includes a housing defining a central longitudinal passageway extending therethrough and a shoulder extending into the passageway. The valve also includes a valve element slideably disposed in the passageway.

The valve element comprises a main body defining a central conduit extending longitudinally therethrough and an expanded external seat. The valve element moves between a closed liquid flow blocking upstream position, wherein the seat is positioned on the shoulder and an open liquid flow downstream position wherein the seat is off the shoulder.

A relatively rigid shock-absorbing component in the form of a bellows is connected to the main body so as to seal the conduit, and moves by elongating or unfolding in response to back pressure directed upstream, thus effectively dampening shocks and preventing audible knocks. The bellows is very durable, is not as subject to elastic fatigue as is the case with balloons, etc., is not fragile and easily worn out and it performs efficiently. The main body of the valve element can be fabricated of any suitable material such as resilient plastic, rubber or the like, while the bellows can be fabricated of non-stretchables, essentially rigid plastic, rubber, or even thin metal in a single accordion folded sheet or in the form of plates or the like hinged together. The bellows can thus be fabricated in a number of ways, depending on the particular needs and intended application of the valve. Further features of the valve of the present invention are set forth in the following detailed description and accompanying drawings.

DRAWINGS

DETAILED DESCRIPTION

FIGS. 1-3

Figure 1:
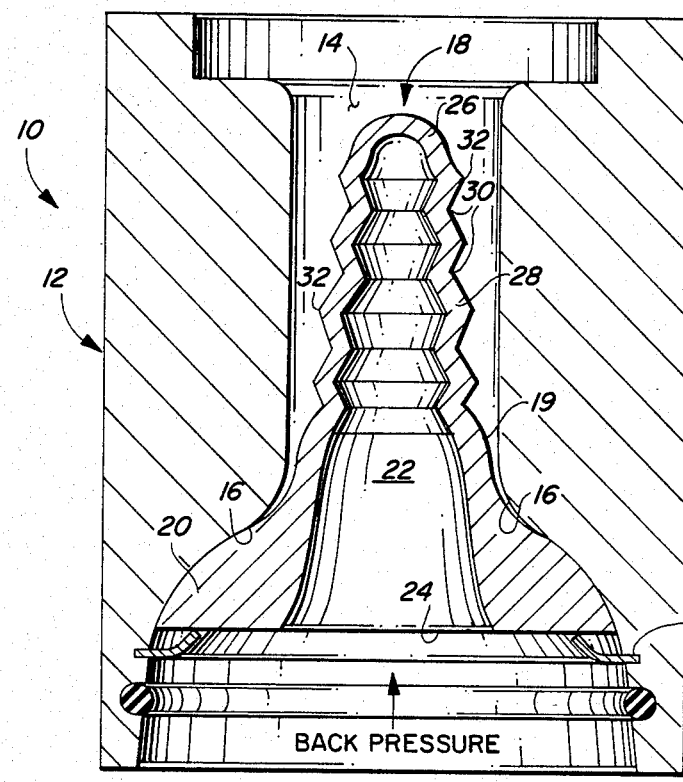
FIG. 1 is a schematic vertical cross-section of a preferred embodiment of the improved shock-absorbing one-way liquid flow control valve of the present invention, shown with the valve element thereof in the closed liquid flow blocking position, and with the back pressure being exerted on the valve to fully extend the valve bellows.
Figure 2:
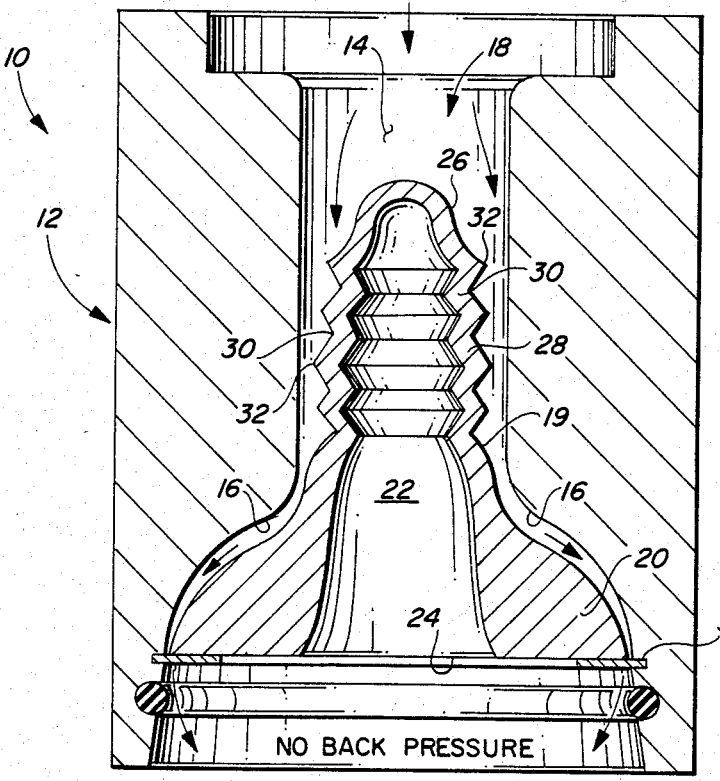
FIG. 2 is a schematic vertical cross-section of the the valve of FIG. 1, shown with the valve element moving into the open liquid flow position, and with the valve bellows collapsing.
Figure 3:
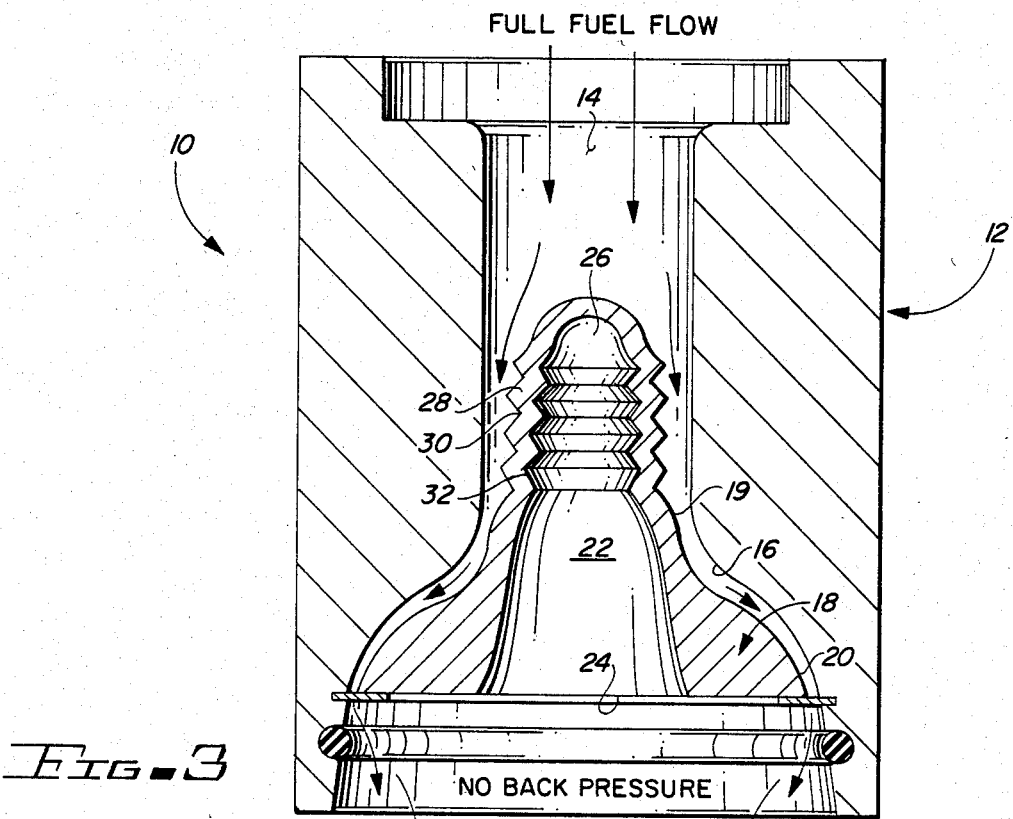
FIG. 3 is a schematic vertical cross-section of the valve of FIG. 1, shown with the valve fully open and the valve bellows fully collapsed.

Now referring more particularly to FIGS. 1 and 3 of the drawings, a preferred embodiment of the improved one-way, shock-absorbing flow control valve of the present invention is schematically depicted therein. Thus, valve 10 is shown which comprises a tubular housing 12 of any suitable material such as metal, ceramic, hard plastic or the like having a central annular passageway 14 extending longitudinally therethrough. Housing 12 will usually be of steel, aluminum or the like. The portion of housing 12 defining passageway 14 is configured to provide an annular shoulder 16 which reduces the diameter of a portion of the passageway 14, as shown in FIGS. 1-3.

Valve 10 also includes a valve element 18 having a main body 19 with an expanded external seat portion 20 adapted to rest against shoulder 16 to seal passageway 14 against the flow of liquid therethrough. Thus, main body 19 of element 18 may be generally cylindrical, or another shape commensurate with the internal configuration of passageway 14, but with expanded seat 20 at the downstream end thereof and a central conduit 22 extending longitudinally therethrough.

Conduit 22 is open at the downstream end 24 thereof and closed at the upstream end 26 thereof by a longitudinally extending bellows 28. Bellows 28 may be separately connected to or integral with the main body 19. Thus, bellows 28 is generally flexible and essentially inelastic, comprising a plurality of more or less rigid segments 30 connected to flexible portions 32 therebetween. Alternatively, the material of bellows 28 can be merely accordion folded.

Valve 10 can be oriented such that valve element 18 is normally in the closed position of FIG. 1 due to gravity. In such case, seat 20 would have to be above shoulder 16, i.e., a position inverted from that illustrated in FIG. 1. Alternatively and conventionally, element 18 can be urged into the closed position of FIG. 1, by suitable means such as a spring 34 or the like. In such position valve 10 is fully closed.

Bellows 28 moves longitudinally between the collapsed folded position of FIG. 3 and the extended unfolded position of FIG. 1, FIG. 2 showing the intermediate position for bellows 28. In the process of such movement, bellows 28 absorbs shocks in an efficient manner. Thus, during normal operation of valve 10, back pressures in valve 10 occur and are directed through passageway 14 and open end 24 of conduit 22 upstream towards closed end 26 thereof, causing bellows 28 to elongate to the position shown in FIG. 1, thus absorbing shocks which otherwise would be transmitted through housing 12 as undesired audible knocks.

When back pressure ceases, bellows 28 collapses to the position of FIG. 3, thus occupying a smaller volume. Such collapse may be aided by gravity in some instances, depending on the orientation of valve 10, and by pressure exerted by the liquid fuel flow downstream during opening of valve 10, as depicted sequentially in FIGS. 2 and 3. Thus, FIG. 1 shows valve 10 fully closed and bellows fully extended due to back pressure, while FIG. 2 shows valve 10 opening for one-way flow of liquid fuel downstream and bellows 28 partially collapsing, while FIG. 3 shows valve fully open and with bellows 28 fully collapsed.

Valve 10 is simple, efficient and very durable and it exhibits pronounced shock-absorbing characteristics as previously described.

FIG. 4

Figure 4:
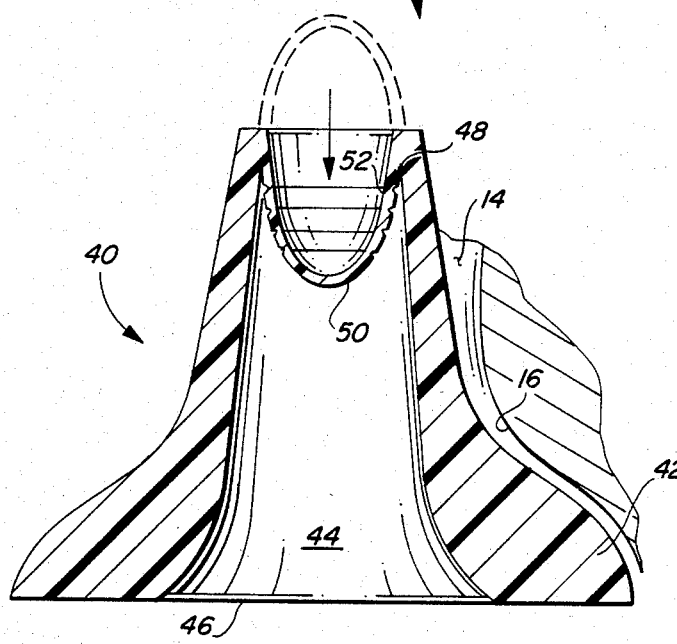
FIG. 4 is a schematic vertical cross-section of a modified version of the valve element utilized in the improved flow control valve of the present invention.

A modified version of the valve element of the present invention is schematic depicted in FIG. 4. Thus, valve element 40 is shown which is useable in valve 10 in place of valve element 18. Valve element 40 is generally frusto-conical with an expanded base 42 which is shaped to seat against shoulder 16 to close passageway 14. Valve element 40 has a central conduit 44 extending longitudinally therethrough. Conduit 44 has an open downstream end 46 and an upstream end 48 closed by bellows 50.

Valve element 40 is preferably of resilient plastic, rubber or the like. Bellows 50 is of essentially inelastic, very flexible material, such as plastic, metal foil or the like which is folded along fold lines 52 and is readily displaceable from the collapsed inverted position shown in solid line in FIG. 4, corresponding to that of bellows 38 in FIG. 3, to the upwardly extended position shown in dotted line in FIG. 4, under the influence of back pressure directed up conduit 44 in the direction of the dotted arrow. The extended position of bellows 50 corresponds to the extended position of bellows 38 in FIG. 1. Bellows 50 has essentially the same functions and advantages as bellows 38.

FIG. 5

Figure 5:
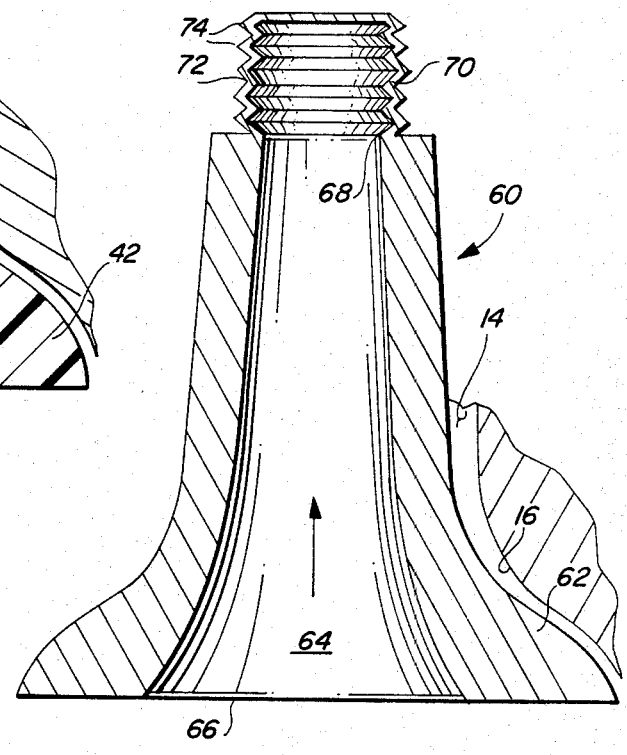
FIG. 5 is a schematic vertical cross-section of a further version of the valve element utilized in the improved flow control valve of the present invention.

FIG. 5 schematically illustrates a further version of the valve element of the present invention. Thus, valve element 60 is shown which can be substituted for valve elements 18 and 40 in valve 10. Valve element 60 is generally frusto-conical, with an expanded external base 62 adapted to seat on shoulder 16 to close passageway 14. A central conduit 64 extends longitudinally through element 60 and has an open downstream end 66 and an upstream end 68 closed by a bellows 70. Bellows 70 is shown in the extended position caused by back pressure passing up through conduit 64 in the direction of the arrow.

Bellows 70 comprises a flexible, essentially inelastic cap of plastic, or the like accordion folded, with transverse fold lines 72 dividing bellows 70 into a plurality of parallel segments 74. Bellows 70, when not under back pressure, collapses to be on top of element 60 at end 68. Bellows 70 has essentially the same functions and advantages as bellows 38 and 50.

The improved, shock-absorbing, one-way liquid flow control valve of the present invention can be fabricated inexpensively, is durable, efficient and capable of being provided in a variety of sizes, shapes and styles. Other advantages of the valve are as set forth in the foregoing.

Various other modifications, changes, alterations and additions can be made in the improved valve of the present invention, its components and their parameters. All such changes, modifications, alterations and additions as are within the scope of the appended claims form part of the present invention.

What is claimed is:

1. An improved shock absorbing, one-way liquid flow control valve, said valve comprising, in combination:
  (a) a housing defining a passageway extending longitudinally therethrough, and a shoulder extending into said passageway;
  (b) a hollow valve element comprising a main body having a longitudinal conduit extending therethrough, said valve element being disposed longitudinally in said valve passageway and having a seat portion of expanded diameter adapted to seat on said shoulder to seal said valve against liquid flow through said passageway, said valve element being longitudinally slideable in said passageway to unseat said expanded diameter portion from said shoulder and thereby open said valve, said valve element also including a bellows connected to said main body and sealing off said conduit, which bellows folds and unfolds longitudinally in response to pressure variations in said passageway, thereby absorbing and dampening shocks generated in said valve,
  (c) wherein said bellows comprises a flexible generally inelastic sheet connected to said main body of said valve element, and
  (d) wherein said bellows moves in response to back pressure from a position within said conduit to a position upstream of said valve element main body to effect shock absorbing dampening.

* * * * *